United States Patent
Qian et al.

(10) Patent No.: US 8,699,461 B2
(45) Date of Patent: Apr. 15, 2014

(54) OPTIMIZED HOME EVOLVED NODEB (ENB) HANDOVER IN AN LTE NETWORK

(75) Inventors: Haibo Qian, Plano, TX (US); Michael Brown, McKinney, TX (US); Curtis Provost, Parker, TX (US)

(73) Assignee: Hitachi, Ltd., Tokyo (JP)

( * ) Notice: Subject to any disclaimer, the term of this patent is extended or adjusted under 35 U.S.C. 154(b) by 137 days.

(21) Appl. No.: 13/213,804

(22) Filed: Aug. 19, 2011

(65) Prior Publication Data

US 2013/0044730 A1     Feb. 21, 2013

(51) Int. Cl.
*H04W 36/08*     (2009.01)

(52) U.S. Cl.
USPC ............ 370/331; 370/310.2; 455/432.1; 455/443; 455/444

(58) Field of Classification Search
USPC ............ 370/310.2, 328–339, 349; 455/422.1, 455/432.1, 436–444
See application file for complete search history.

(56) References Cited

U.S. PATENT DOCUMENTS

| | | | |
|---|---|---|---|
| 2011/0045823 A1* | 2/2011 | Wang et al. | 455/424 |
| 2011/0223919 A1* | 9/2011 | Vikberg et al. | 455/436 |
| 2011/0237258 A1* | 9/2011 | Nylander et al. | 455/437 |
| 2011/0243097 A1* | 10/2011 | Lindqvist et al. | 370/331 |
| 2011/0244863 A1* | 10/2011 | Matsuo et al. | 455/436 |
| 2011/0256872 A1* | 10/2011 | Xu | 455/436 |
| 2011/0269465 A1* | 11/2011 | Xu et al. | 455/436 |
| 2011/0274086 A1* | 11/2011 | Xu | 370/331 |
| 2011/0274276 A1* | 11/2011 | Xu | 380/272 |
| 2011/0286429 A1* | 11/2011 | Vikberg et al. | 370/331 |
| 2012/0083245 A1* | 4/2012 | Adjakple et al. | 455/411 |
| 2012/0307795 A1* | 12/2012 | Takahashi et al. | 370/331 |

FOREIGN PATENT DOCUMENTS

JP     2011-41238 A   *   2/2011     ............ H04W 36/22

OTHER PUBLICATIONS

Wang et al., Mobility Management Schemes at Radio Network Layer for LTE Femtocells, Apr. 26, 2009-Apr. 29, 2009, Vehicular Technology Conference, 2009, VTC SPring 2009, IEEE, 5 pages.*

* cited by examiner

*Primary Examiner* — Hoon J Chung
(74) *Attorney, Agent, or Firm* — David H. Judson

(57) ABSTRACT

A method to provide an optimized intra-HeNB GW handover operation that reduces signaling to and from an LTE MME (Mobility Management Entity) function of the 3GPP E-UTRAN Evolved Packet core (EPC). In operation, an HeNB Gateway (GW) intercepts handover requests from a source HeNB to a target HeNB and processes these requests locally, with minimal interaction from the MME. Where possible, messaging to and from the MME is minimized and/or reduced, irrespective of the 3GPP requirement that the GW relay all handover-related messages to the MME.

16 Claims, 3 Drawing Sheets

OPTIMIZED HOME EVOLVED NODEB (ENB) HANDOVER IN AN LTE NETWORK

TECHNICAL FIELD

This disclosure relates generally to mobile broadband networking technologies, such as the Evolved 3GPP Packet Switched Domain that provides IP connectivity using the Evolved Universal Terrestrial Radio Access Network (E-UTRAN).

RELATED ART

Evolved Packet Core (EPC) is the Internet Protocol (IP)-based core network defined by 3GPP in Release 8 for use by Long-Term Evolution (LTE) and other wireless network access technologies. The goal of EPC is to provide an all Internet Protocol (IP)-based core network architecture to efficiently give access to various services. In LTE, an MME (Mobility Management Entity) function provides an anchor for mobile devices (User Equipment or "UE") as they move across the system within the geographic area covered by an MME node. EPC comprises a MME and a set of access-agnostic Gateways for routing of user datagrams. The radio access part of the LTE system is an evolved Node B (eNB). Each eNB typically comprises an antenna system, together with base station radio equipment. Moreover, in addition to a radio transmitter and a receiver, an eNB also includes resource management and logic control functions that, traditionally, were separated into base station controllers (BSCs) or radio network controllers (RNCs). By including this added capability, eNBs communicate directly with each other, thereby obviating mobile switching systems (MSCs) or controllers (BSCs or RNCs). Communications between eNBs include handover. Under the LTE standard, LTE eNB is required to implement both inter-eNB and intra-eNB handover procedure inside E-UTRAN.

A femto cell is a radio access network element that supports a limited number of simultaneous users in a home environment in a limited geographic area over one or more of the GSM/WCDMA family of radio interfaces. A 3G femto access point is called a home nodeB (HNB). A CSG (Closed Subscriber Group) is used to describe a specific group of mobile devices that are permitted access to a particular femto cell. For LTE, a logical architecture for a "home eNB" (HeNB) may be implemented. An HeNB has a set of S1 interfaces to connect the HeNB to the EPC. In this approach, the E-UTRAN architecture also may deploy a Home eNB Gateway (HeNB GW) to allow the S1 interface between the HeNB and the EPC to scale to support a large number of HeNBs.

The 3GPP specification requires that the HeNB GW relays all UE associated S1 application part messages between the HeNB and the MME. This requirement increases the amount of signaling the EPC (namely, the MME and the SGW (serving gateway)) needs to process. It would be desirable to optimize handover of a UE between the HeNBs that are connected to a same HeNB GW while reducing the amount of signaling to the EPC.

This disclosure addresses this need in the art.

BRIEF SUMMARY

This disclosure describes a method to provide an optimized intra-HeNB Gateway handover operation that reduces signaling to and from an LTE MME (Mobility Management Entity) function of the 3GPP E-UTRAN Evolved Packet core (EPC).

In operation, the HeNB Gateway (GW) intercepts handover requests from an HeNB (the "source HeNB") and determines if the target cell is another HeNB (the "target HeNB") that is connected to the gateway. If (i) the target HeNB is in the same tracking area (as identified by a tracking area identifier (TAI)) as the source HeNB, (ii) the target HeNB either is open or supports the CSG identifier indicated by the source, and (iii) both source and target HeNB use the HeNB GW S1-U data path interface, then the HeNB GW processes the handover procedure locally with limited interaction with the MME. If (i) the target HeNB either is open or supports the CSG identifier indicated by the source, and either (ii) the target HeNB is not in the same TAI as the source HeNB, or (iii) either source or target HeNB do not use the HeNB GW S1-U interface, then the HeNB GW still processes the handover procedure locally by converting it into an X2-based handover message to the MME. In both scenarios, messaging to and from the MME is minimized and/or reduced, irrespective of the 3GPP requirement that the GW relay all handover messages to the MME.

The foregoing has outlined some of the more pertinent features of the subject matter. These features should be construed to be merely illustrative. Many other beneficial results can be attained by applying the disclosed subject matter in a different manner or by modifying the subject matter as will be described.

DETAILED DESCRIPTION

The following detailed description presumes familiarity with the General Packet Radio Service (GPRS) enhancements for E-UTRAN access described in 3GPP Mobile Broadband Standard Reference Specification 3GPP TS 23.401. The LTE Intra E-UTRAN Handover, in particular, is described at 3GPP TS 36.300.

Figure 1:
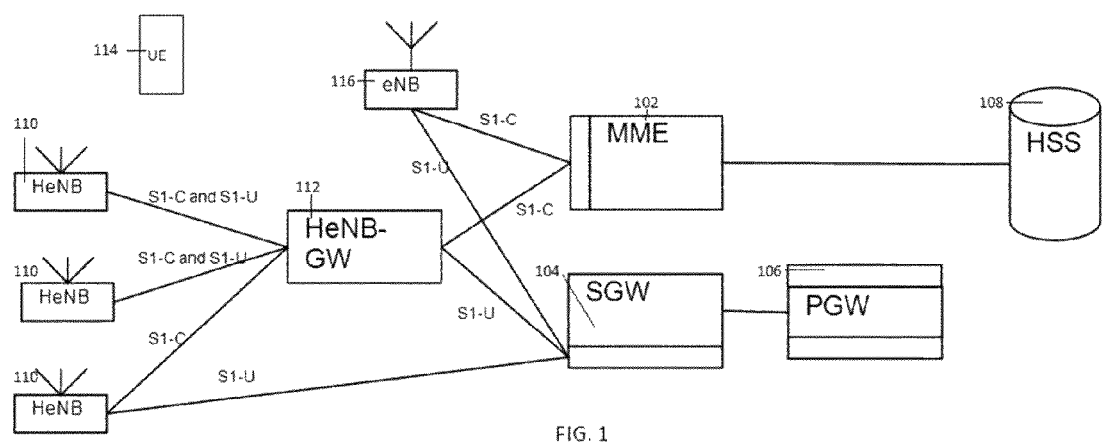
FIG. 1 is a simplified block diagram of an Evolved Packet Core (EPC)-based network that deploys a Home eNB Gateway (HeNB GW) to allow the S1 interface between an HeNB and the EPC to scale to support a large number of HeNBs.

As illustrated in FIG. 1, a representative LTE network 100 in which the disclosed handover technique may be implemented comprises an MME 102, an SGW 104, a PGW 106, an HSS 108, and a set of home evolved Node Bs 110 (each an HeNB) coupled to a home evolved nodeB gateway (HeNB GW) 112. The MME 102 is the primary control node for the LTE access-network. Among other functions, the MME 102 is responsible for idle mode UE (User Equipment) tracking and paging procedure including retransmissions. The Serving Gateway (SGW) 104 routes and forwards user data packets, while also acting as the mobility anchor for the user plane during inter-eNodeB handovers. The MME is responsible for choosing the SGW for a UE at the initial attach and at time of intra-LTE handover involving Core Network (CN) node relocation. The PDN Gateway (PGW) 106 provides connectivity from the UE to external packet data networks by being the point of exit and entry of traffic for the UE. The Home Subscriber Server (HSS) 108 is a central database that contains user-related and subscription-related information. HSS 108 also provides mobility management, call and session establishment support, user authentication and access authorization.

The HeNB GW 112 provides S1-C and/or S1-U interfaces to the HeNBs 110 connected to the gateway. The HeNB GW allows the S1 interface between the HeNB and the EPC to scale to support a large number of HeNBs 110. In operation, the HeNB GW serves as a concentrator for the C-Plane, specifically the S1-MME interface. The S1-U interface from the HeNB may be terminated at the HeNB GW, or a direct logical U-Plane connection between HeNB and S-GW may be used.

An eNB is the radio access part of the LTE system. As is well-known, each eNB typically comprises at least one radio transmitter, a receiver, a control section, and a power supply. In addition, eNBs typically implement various software-based functions, such as radio resource management, access control, connection mobility management, resource scheduling, header compression, link encryption of the user data stream, packet routing of user data towards its destination (usually to the EPC or other eNBs), and measurement reporting (to assist in handover decisions).

An LTE eNB is required to implement handover procedure inside E-UTRAN. As seen in FIG. 1, intra E-UTRAN Handover is used, for example, to hand over a UE 114 from a source eNodeB 116 to a target eNodeB (not shown), typically using an X2-based handover message when the MME is unchanged. When there is no direct X interface between the source eNodeB and the target eNodeB, S1-based handover messaging sequence is used. Home eNodeB 110 based on Release 8 of the 3GPP Specification does not provide an X2 interface; therefore, S1-based handover is used. As described in the 3GPP Specification, during this handover procedure, the HeNB GW relays all messages to the MME, which is undesirable. To address this problem, a method of optimizing an intra-HeNB handover procedure is implemented by the HeNB GW, and is described below. This optimized GW handover procedure significantly reduces the amount of signaling relayed by the GW to and from the MME, thereby reducing EPC capacity requirements, reducing network bandwidth, increasing reliability, and reducing cost.

Optimized Intra-HeNB GW Handover

Figure 2:
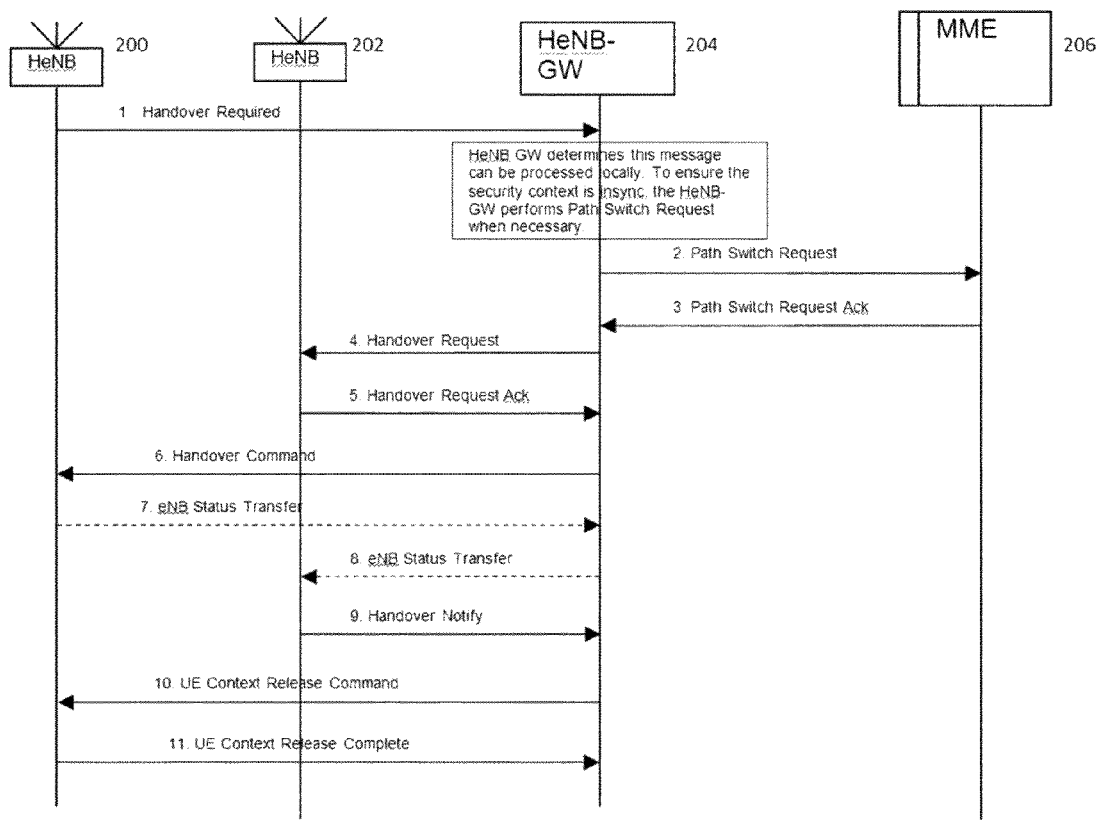
FIG. 2 is a time sequence diagram illustrating a first embodiment of this disclosure for reducing MME signaling during an intra-HeNB Gateway handover procedure wherein the source and target HeNBs are co-located within a same tracking area.

A preferred approach for this technique, is illustrated in FIG. 2, which is a time sequence diagram illustrating a first embodiment of this disclosure for reducing MME signaling during an intra-HeNB handover procedure. In this embodiment, the source HeNB 200 and the target HeNB 202 are co-located within a same tracking area (as identified by a tracking area identifier, or TAI), and both are coupled to the HeNB GW 204 and use the S1-U interface of the HeNB GW. The GW is coupled to the MME 206 over the S1-C interface and to the SGW (not shown) over the S1-U interface. To enable the handover signalizing optimization of this disclosure, preferably the HeNB GW stores data needed during the establishment of the signaling path among the UE (not shown), HeNB GW 204 and the MME 206. This information includes, without limitation, a handover restriction list, security parameters, UE radio access capability data, and the like.

As illustrated in FIG. 2, the handover procedure begins at step 1, with the source HeNB 200 issuing to the GW 204 a Handover Required message. At step 2, the GW 204 sends a Path Switch Request message to the MME 206, which, in response, returns a Path Switch Request Ack message in step 3. At step 4, the GW 204 issues a Handover Request message to the target HeNB 202, which responds back to the GW 204 at step 5 with a Handover Request Ack message. At step 6, the GW 204 issues a Handover command message to the source HeNB 200, which responds back to the GW 204 at step 7 with an eNB Status Transfer message. At step 8, the GW 204 issues an eBN Status Transfer message to the target HeNB 202, which responds back to the GW 204 at step 9 with a Handover Notify message. At step 10, the GW 204 issues a UE Context Release Command to the source HeNB 200. The source HeNB 200 responds back to the GW 204 at step 11 with a UE Context Release Complete message. This completes the typical handover sequence.

In the absence of the optimization technique disclosed herein, the GW 204 (to ensure 3GPP compliance) relays (to/from the MME) each of the signaling messages in steps 1 and 4-11. Such operations are obviated according to the embodiment described by having the HeNB GW 204 determine that the Handover Required message (in step 1) can be processed "locally"—i.e., without the necessity of having to relay all messages to and from the MME. According to this first embodiment, this determination (that local handover processing can be effected) is made when the following conditions are all met: (i) the target HeNB 202 is in the same tracking area (as identified by a tracking area identifier (TAI)) as the source HeNB 200, (ii) the target HeNB 202 either is open or supports the CSG identifier indicated by the source 200, and (iii) both source and target HeNB use the HeNB GW S1-U interface. In such case, and according to this disclosure, the HeNB GW 204 processes the handover procedure locally, i.e., with limited interaction with the MME. In this particular embodiment, as illustrated in FIG. 2, this limited interaction is merely the sending of the Path Switch Request message (step 2), and the receipt of the Path Switch Request Ack message (step 3). While these messages are conventional, one of ordinary skill in the art will appreciate that the messages themselves are being used here in a manner that differs from their typical use. In other words, according to this disclosure, these standardized messages, in effect, are re-purposed to facilitate the localized handover procedure. In this example scenario, the purpose of steps 2 and 3 is to ensure synchronization of security keys between the UE and the source and target HeNBs.

This alternative use of these standardized messages is a preferred implementation, but not a requirement, as other alternative solutions may be used. Thus, for example, one variant is to enhance an S1 message, or to define a new message, instead of reusing the Path Switch Request. In another variant, the Handover Required (step 1) and Handover Request (step 4) messages can be enhanced to pass (to the target HeNB 202) a current HeNB used by the source HeNB 200. In yet another variant to this approach, the MME 204 may be programmed to supply more than one Security Context when the UE context is established on a HeNB via the HeNB GW. These latter options eliminate the necessity of using steps 2 and 3 in FIG. 2, thereby further reducing the impact to the MME.

Figure 3:
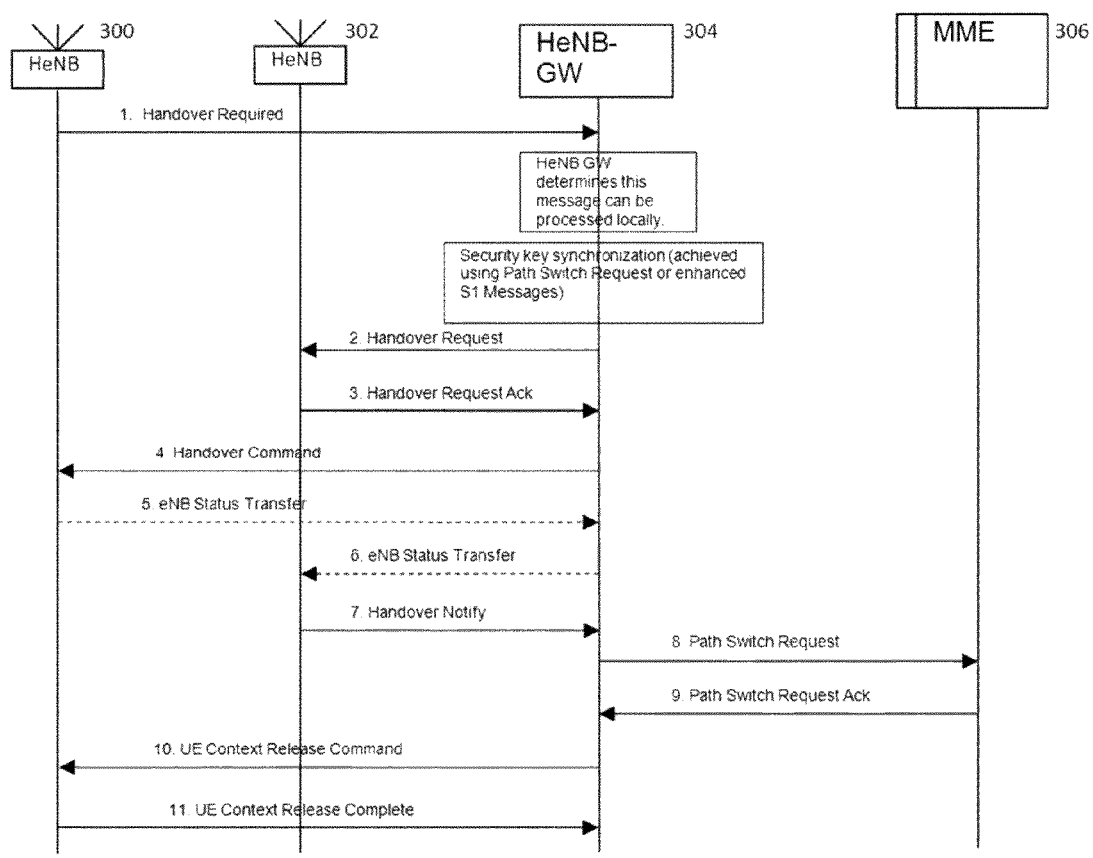
FIG. 3 is a time sequence diagram illustrating a second embodiment of this disclosure for reducing MME signaling during an intra-HeNB Gateway handover procedure wherein the source and target HeNBs are located in different tracking areas.

FIG. 3 is a time sequence diagram illustrating a second embodiment of this disclosure for reducing MME signaling during an intra-HeNB GW handover procedure wherein the source and target HeNBs are located in different tracking areas. In this embodiment, both of the source and target HeNBs are coupled to the HeNB GW 304; further, the target HeNB 302 either is open or supports the CSG id indicated by the source HeNB 300. Either or both of the following conditions differ from the first embodiment (namely, FIG. 2): the source HeNB 300 and the target HeNB 302 are not located within a same tracking area, or, at most, one of them (but not both) uses the S1-U interface of the HeNB GW. Once again, and as in the FIG. 2 embodiment, the GW 304 is coupled to the MME 306 over the S1-C interface and to the SGW (not shown) over the S1-U interface. Once again, and to enable the handover signalizing optimization of this disclosure, preferably the HeNB GW 304 stores data needed during the establishment of the signaling path among the UE (not shown), HeNB GW 304 and the MME 306.

As illustrated in FIG. 3, the handover procedure in this embodiment begins at step 1, with the source HeNB 300 issuing to the GW 304 a Handover Required message. At step 2, the GW 304 issues a Handover Request message to the target HeNB 302, which responds back to the GW 304 at step 3 with a Handover Request Ack message. At step 4, the GW 304 issues a Handover Command message to the source HeNB 300, which responds back to the GW 304 at step 5 with an eNB Status Transfer message. At step 6, the GW 304 issues an eBN Status Transfer message to the target HeNB 302, which responds back to the GW 304 at step 7 with a Handover Notify message. At step 8, the GW 304 sends a Path Switch Request message to the MME 306, which, in response, returns a Path Switch Request Ack message in step 9. At step 10, the GW 304 issues a UE Context Release Command to the source HeNB 300. The source HeNB 300 responds back to the GW 304 at step 11 with a UE Context Release Complete message. This completes the typical handover sequence.

As contrasted with the FIG. 2 embodiment, in the FIG. 3 embodiment the Path Switch Request (step 8) and Path Switch Request Ack messages (step 9) are used in their conventional manner. Primarily, these messages are used in this embodiment to ensure that the UE and the MME remain in synchronization, and to pass location information.

According to the FIG. 3 embodiment, the HeNB GW also performs "local" processing of the handover. The determination that local handover processing can be carried out, however, is made when the following conditions are all met: (i) the target HeNB 302 either is open or supports the CSG identifier indicated by the source HeNB 300, and either (ii) the target HeNB 302 is not in the same TAI as the source HeNB 300, or (iii) either source or target HeNB do not use the HeNB GW S1-U interface. When these conditions are met, the HeNB GW processes the handover procedure locally, preferably by converting it into an X2-based handover message to the MME. While the MME messaging (steps 8-9) is required here, the technique still meets the goal of reducing the amount of messaging sent to and from the MME, as messages 1-7 and 10-11 need not traverse the GW to/from the MME.

Thus, in the FIG. 3 embodiment as well, messaging to and from the MME is reduced, irrespective of the 3GPP requirement that the GW relay all handover messages to the MME.

Preferably, the HeNB GW is implemented as hardware, namely one or more processors, computer memory, and software executed by the processors to perform the functions described above. Thus, the functions illustrated in FIGS. 2 and 3 preferably are implemented as software, e.g., processor-executed program instructions, in each of the machines as needed to implement the above-described operations. Each machine comprises associated data structures and utilities (e.g., communication routines, database routines, and the like) as needed to facilitate the communication, control and storage functions.

An HeNB GW that provides the functionality described herein is implemented in a machine comprising hardware and software systems. The described handover functionality may be practiced, typically in software, on one or more such machines. Generalizing, a machine typically comprises commodity hardware and software, storage (e.g., disks, disk arrays, and the like) and memory (RAM, ROM, and the like). The particular machines used in the network are not a limitation. A given machine includes the described network interfaces (including, without limitation, the S1-C, S1-U and other interfaces) and software to connect the machine to other components in the radio access network in the usual manner. More generally, the techniques described herein are provided using a set of one or more computing-related entities (systems, machines, processes, programs, libraries, functions, or the like) that together facilitate or provide the inventive functionality described above. In a typical implementation, the HeNB-GW comprises one or more computers. A representative machine comprises commodity hardware, an operating system, an application runtime environment, and a set of applications or processes and associated data, that provide the functionality of a given system or subsystem. As described, the functionality may be implemented in a standalone node, or across a distributed set of machines.

The handover technique may be implemented by other nodes in the network, such as HeNB nodes, the MME itself, or the like.

There is no requirement that the specific handover messaging protocol described above in FIG. 2 or FIG. 3 be implemented, provided that the GW can determine that the Handover Required message can be processed locally.

Having described our invention, what we now claim is set forth below:

The invention claimed is:

1. A handover method operating within an evolved packet core (EPC) network having a Mobility Management Entity (MME) and a set of Home evolved NodeB (HeNB) nodes associated with a Home eNB Gateway (HeNB GW), comprising:
   responsive to receipt of a first message requesting a handover from a source HeNB to a target HeNB, determining, at the HeNB GW, whether the handover can be processed locally at the HeNB GW by evaluating whether (i) the target HeNB is in a same tracking area as the source HeNB, (ii) the target HeNB either is open or supports a Closed Subscriber Group (CSG) identifier indicated by the source HeNB, and (iii) both the source and target HeNB use a same HeNB GW data path interface; and
   if the handover from the source HeNB to the target HeNB can be processed locally because (i) the target HeNB is in the same tracking area as the source HeNB, (ii) the target HeNB either is open or supports the Closed Subscriber Group (CSG) identifier indicated by the source HeNB, and (iii) both the source and target HeNB use the same HeNB GW data path interface, completing the handover from the source HeNB to the target HeNB without relaying at least one or more handover protocol messages between the HeNB GW and the MME.

2. The method as described in claim 1 wherein the handover also can be processed locally if (i) the target HeNB either is open or supports a Closed Subscriber Group (CSG) identifier indicated by the source HeNB, and either (ii) the target HeNB is not in a same tracking area as the source HeNB, or (iii) either the source HeNB or the target HeNB does not use a same HeNB GW data path interface.

3. The method as described in claim 1 wherein the handover is completed by re-purposing at least one standard message to facilitate transfer of security information between the MME to the HeNB GW.

4. The method as described in claim 3 wherein the at least one standard message is a path switch request message.

5. The method as described in claim 1 wherein the handover is completed by transfer of security information from the source HeNB to the HeNB GW.

6. The method as described in claim 1 wherein the handover is completed by transfer of security information from the MME to the HeNB GW using a security context established when a UE context is established on the source HeNB.

7. The method as described in claim 1 wherein the first message is a handover required message.

8. A Home evolved NodeB Gateway (HeNB GW) apparatus for use in an evolved packet core (EPC) network, the HeNB GW coupled to a set of HeNBs, and a Mobility Management Entity (MME), comprising:
a processor;
a computer memory holding computer program instructions which when executed by the processor perform a handover method comprising:
responsive to receipt of a first message requesting a handover from a source HeNB to a target HeNB, determining whether the handover can be processed locally by evaluating whether (i) the target HeNB is in a same tracking area as the source HeNB, (ii) the target HeNB either is open or supports a Closed Subscriber Group (CSG) identifier indicated by the source HeNB, and (iii) both the source and target HeNB use a same HeNB GW data path interface; and
if the handover from the source HeNB to the target HeNB can be processed locally because (i) the target HeNB is in the same tracking area as the source HeNB, (ii) the target HeNB either is open or supports the Closed Subscriber Group (CSG) identifier indicated by the source HeNB, and (iii) both the source and target HeNB use the same HeNB GW data path interface, completing the handover from the source HeNB to the target HeNB without relaying at least one or more handover protocol messages to or from the MME.

9. The apparatus as described in claim 8 wherein the handover also can be processed locally if (i) the target HeNB either is open or supports a Closed Subscriber Group (CSG) identifier indicated by the source HeNB, and either (ii) the target HeNB is not in a same tracking area as the source HeNB, or (iii) either the source HeNB or the target HeNB does not use a same HeNB GW data path interface.

10. The apparatus as described in claim 8 wherein the handover is completed by re-purposing at least one standard message to facilitate transfer of security information between the MME to the HeNB GW.

11. The apparatus as described in claim 8 wherein the handover is completed by transfer of security information from the source HeNB to the HeNB GW.

12. The apparatus as described in claim 8 wherein the handover is completed by transfer of security information from the MME to the HeNB GW using a security context established when a UE context is established on the source HeNB.

13. A method operative in a Home Evolved NodeB (HeNB) gateway to which a set of source and target HeNB nodes are coupled, comprising:
responsive to receipt of a handover request from a source HeNB node to a target HeNB node, determining, at the HeNB gateway, if (i) the target HeNB node is in a same tracking area as the source HeNB node, (ii) the target HeNB node either is open or supports a Closed Subscriber Group (CSG) identifier indicated by the source HeNB node, and (iii) both the source HeNB node and the target HeNB node use a same gateway interface; and
processing the handover request locally, at the HeNB gateway, and completing the handover from the source HeNB node to the target HeNB node without relaying at least one or more handover protocol messages between the HeNB GW and a Mobility Management Entity (MME) when conditions (i)-(iii) are true.

14. The method as described in claim 13 wherein the source HeNB node and the target HeNB node use the gateway S1-U interface.

15. The method as described in claim 13 wherein the handover request is processed locally by re-purposing at least one standard message.

16. The method as described in claim 15 wherein the at least one standard message is a path switch request message.

* * * * *